United States Patent
Jun et al.

(10) Patent No.: US 8,566,461 B1
(45) Date of Patent: Oct. 22, 2013

(54) MANAGED ACCESS TO MEDIA SERVICES

(75) Inventors: Gyuchang Jun, Sunnyvale, CA (US);
Kurt Huang, Mountain View, CA (US);
Duane Kuroda, Campbell, CA (US)

(73) Assignee: Digital River, Inc., Minnetonka, MN (US)

( * ) Notice: Subject to any disclaimer, the term of this patent is extended or adjusted under 35 U.S.C. 154(b) by 1256 days.

(21) Appl. No.: 11/148,594

(22) Filed: Jun. 8, 2005

Related U.S. Application Data

(60) Provisional application No. 60/578,758, filed on Jun. 9, 2004.

(51) Int. Cl.
*G06F 15/16* (2006.01)

(52) U.S. Cl.
USPC ........... 709/229; 709/225; 713/159; 713/172; 713/185; 726/9

(58) Field of Classification Search
USPC .......... 709/203, 225, 229; 713/159, 172, 185; 726/9
See application file for complete search history.

(56) References Cited

U.S. PATENT DOCUMENTS

| | | | |
|---|---|---|---|
| 6,360,254 B1 | 3/2002 | Linden et al. | |
| 6,484,197 B1 * | 11/2002 | Donohue | 709/206 |
| 6,505,300 B2 * | 1/2003 | Chan et al. | 713/164 |
| 6,718,328 B1 * | 4/2004 | Norris | 709/229 |
| 6,779,115 B1 * | 8/2004 | Naim | 713/192 |
| 6,868,403 B1 * | 3/2005 | Wiser et al. | 705/51 |
| 6,948,061 B1 * | 9/2005 | Dierks | 713/159 |
| 7,454,356 B2 | 11/2008 | Fields et al. | |
| 7,603,469 B2 * | 10/2009 | Fletcher et al. | 709/229 |
| 7,962,415 B2 * | 6/2011 | Gupta et al. | 705/51 |
| 8,051,491 B1 * | 11/2011 | Cavage et al. | 726/30 |
| 8,095,972 B1 * | 1/2012 | Floyd et al. | 726/9 |
| 8,281,136 B2 * | 10/2012 | Ramakrishna | 713/172 |
| 8,316,091 B2 * | 11/2012 | Hirvela et al. | 709/206 |
| 8,333,317 B2 * | 12/2012 | Buer et al. | 235/380 |
| 8,447,858 B1 * | 5/2013 | Venkatraman | 709/225 |
| 2001/0045451 A1 | 11/2001 | Tan et al. | |
| 2002/0177433 A1 | 11/2002 | Bravo et al. | |
| 2003/0037070 A1 * | 2/2003 | Marston | 707/200 |
| 2003/0061250 A1 | 3/2003 | Fujita et al. | |
| 2003/0099353 A1 | 5/2003 | Goh et al. | |
| 2003/0120943 A1 | 6/2003 | Hughes | |

(Continued)

OTHER PUBLICATIONS

"Speedera Streaming Solutions", Streaming Services. <http://www.speedera.com/pdfs/Streaming_Datasheet.pdf> 2004 Speedera Networks, Inc. Santa Clara, CA.

(Continued)

*Primary Examiner* — Michael Won
(74) *Attorney, Agent, or Firm* — Billion & Armitage; Richard E. Billion

(57) ABSTRACT

Methods, apparatuses and systems directed to account-based access to media services are described. A media access controller server validates a voucher for an offer of network content and issues a token permitting access to the content. A media access manager server validates the token and invokes a playlist-generation step at a publishing point, and returns the content to a user's media player. A custom plug-in on the media access manager may enforce terms of service imposed by the publisher, such as a maximum number of simultaneous streams permitted by a single voucher, or a time window for use of the voucher. Streams whose voucher's end time has expired are terminated by the plug-in.

13 Claims, 4 Drawing Sheets

(56) References Cited

U.S. PATENT DOCUMENTS

| | | |
|---|---|---|
| 2004/0243475 A1 | 12/2004 | Aronsson et al. |
| 2005/0060389 A1* | 3/2005 | Cherkasova et al. ........... 709/220 |
| 2006/0059346 A1* | 3/2006 | Sherman et al. .............. 713/175 |
| 2006/0085862 A1* | 4/2006 | Witt et al. ........................ 726/26 |
| 2006/0095779 A9* | 5/2006 | Bhat et al. ..................... 713/182 |
| 2006/0184997 A1 | 8/2006 | La Rotonda et al. |
| 2006/0190616 A1 | 8/2006 | Mayerhofer et al. |
| 2006/0225138 A1 | 10/2006 | Toyohara et al. |
| 2007/0219908 A1 | 9/2007 | Martinez |
| 2008/0183628 A1 | 7/2008 | Oliver et al. |

OTHER PUBLICATIONS

"Bringing your audio and video streams to the world—securely", SpeedSuite. <http://www.speedera.com/primary/services/Secure.htm> 2005 Speedera Networks, Inc. Santa Clara, CA.

"Secure Streaming", Akamai Streaming. <http://www.akamai.com/en/html/services/streaming_secure.html> 2005 Akamai Technologies, Inc. Beverly Hills, MI.

"Abacast Secure Stream API Reference", Doc Version 1.0.30.3, Abacast Streaming Media Software. Jun. 18, 2004. Abacast, Inc. Washougal, WA.

* cited by examiner

US 8,566,461 B1

MANAGED ACCESS TO MEDIA SERVICES

CROSS-REFERENCE TO RELATED APPLICATION

This patent application is a conversion of U.S. provisional application Ser. No. 60/578,758, filed Jun. 9, 2004; pending, the priority date of which is claimed and the disclosure of which is incorporated by reference.

BACKGROUND

Field of the Invention

The invention relates to network media and other online content, and methods of managing access to such media.

SUMMARY

The invention provides methods and apparatuses for managed access to network media, whereby users are able to access media on an account basis rather than on a license basis. Methods are provided whereby publishers of network media can offer such media on more flexible terms of service than have hitherto been supported, while still restricting access to users who have complied with the terms.

DETAILED DESCRIPTION

Figure 1:
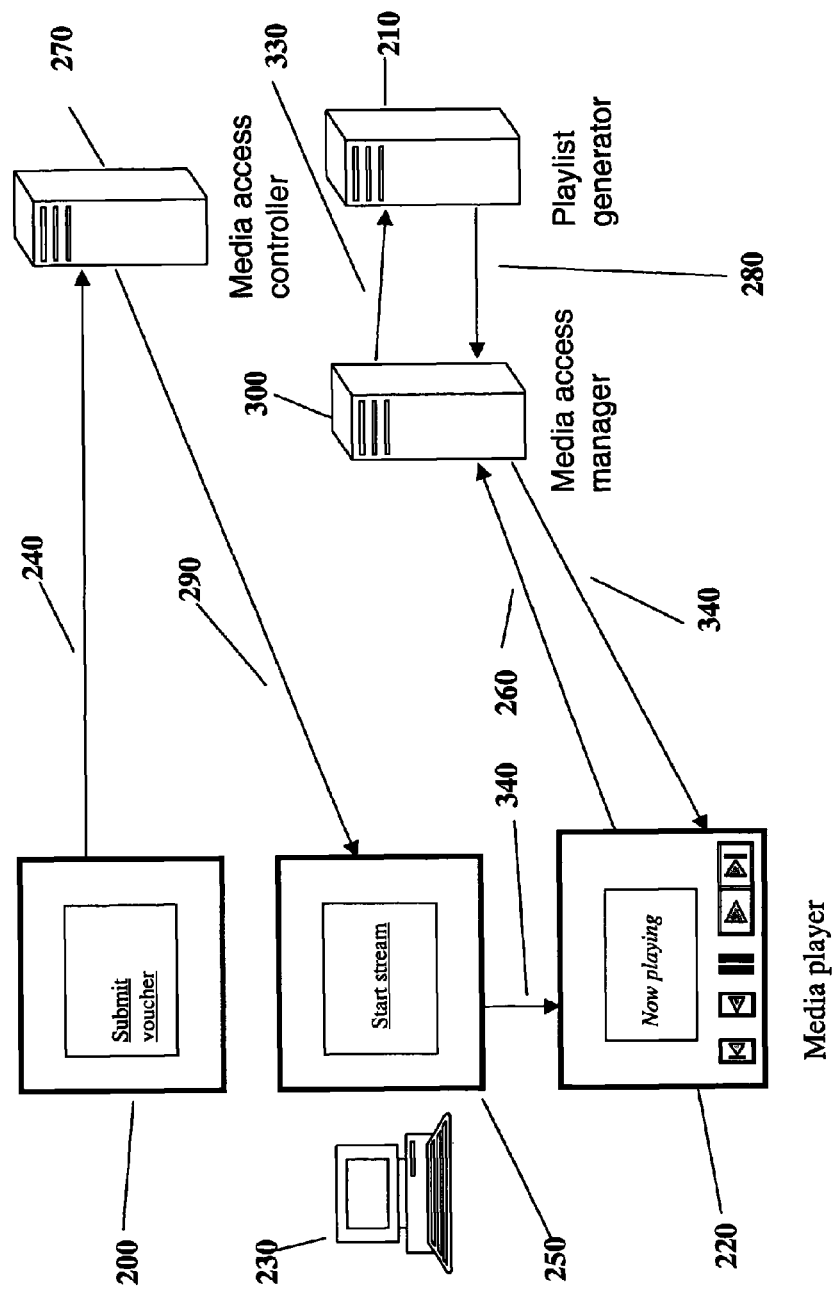
FIG. 1 is a diagram illustrating a network with attached servers belonging to seller and personal computer, personal media player, and web pages, illustrating the flow of control in one embodiment of the invention.

HTTP (for HyperText Transfer Protocol) is the primary method used to convey information on the World Wide Web.

A Uniform Resource Locator, URL or Web address, is a standardized address for some resource (such as a document or image) on the Internet or elsewhere. First created by Tim Berners-Lee for use on the World Wide Web, the currently used forms are detailed by Internet standard RFC 1738.

An HTTP cookie (usually called simply a cookie) is a packet of information sent by a server to a World Wide Web browser and then sent back by the browser each time it accesses that server. Cookies are used by a server to maintain state between otherwise stateless HTTP transactions, and are often used for authentication, personalization, shopping baskets, and other information about the user accessing the server.

The term "server", when used here, is broadly understood to mean any computing entity or family of such entities capable of responding to user requests over a network. The computing entities may be computer servers or server farms, general purpose digital computers, personal digital assistants, special-purpose devices such as printers or scanners with digital processors built in, or specialized hardware devices such as XML chips or XML computers; either containing storage units or making use of storage units elsewhere on the network. The family of computing entities may be geographically distributed or may be "virtual" entities within a larger entity.

The terms "media" and "network content", when used here, are broadly understood to mean any form of digital data capable of being rendered into a form or forms capable of apprehension by human senses, be they vision, hearing, smell, touch, taste, or other. It can include voice, video, audio, either streaming or downloaded; electronic games, broadcast television, video-on-demand, IPTV, interactive television, advertisements, text, graphics, and other forms of human-sensible digital data.

The term "media server", when used here, is broadly understood to mean a server capable of providing media over a network.

The term "publisher", when used here, is broadly understood to mean an entity, public or private, owning rights to some form of media and offering it for sale or distribution via a network.

The term "publishing point", when used here, is broadly understood to mean an address of a service running on a server and capable of providing access to media over a network. It can include a URL when the network is the Internet, a network address, or other method of addressing such a service. The service identified by the publishing point may not have direct access to the media, and may instead provide access to the media via forwarding to another publishing point, which may in turn forward to another publishing point. The term "source publishing point" when used here, is broadly understood to mean a publishing point which provides access to media without forwarding.

The term "plug-in", when used here, is broadly understood to mean a set of computer instructions capable of executing on a server. It can include a DLL, shared library, a compiled program in a language such as C, C++, Visual Basic, COBOL, a script in a scripting language such as Perl, JavaScript, Ruby, MS-DOS batch file, or Unix shell script, a set of byte codes interpreted by an interpreter such as Java or Python, or other computer code.

The term "media player", when used here, is broadly understood to mean any computing or electronic entity or family of such entities capable of rendering electronic media into a form or forms capable of apprehension by human senses, be they vision, hearing, smell, touch, taste, or other. The computing or electronic entities may be televisions, CD players, stereo systems, home media centers, personal computers, personal music players such as MP3 players, video game consoles such as Sony Playstation, Microsoft's Xbox or Xbox 360, personal digital assistants such as PalmPilots or iPaqs, wired telephones, cell phones, or other devices.

The term "transaction", when used here, is broadly understood to mean an action performed between at least two parties, one of whom is an entity acting on behalf of a publisher of network content, and another of whom is a user wishing to gain access to such content. The transaction could include payment via cash, check, credit card, PayPal or other such payment services, presentation of a coupon or other promotional offer, or any means whereby the user meets the access requirements of the publisher.

Publishers of network media have a business goal to retain control of their media objects and prevent the objects from becoming freely available, or pirated, as has happened with online music and movies on the Internet in the past. Further, even when a media object has been properly licensed or sold to an individual user, unlimited copying of such objects by the user must be prevented. Vendors of network hardware and software endeavor to meet such goals by various systems of encryption, licensing, digital rights management hardware and software, subscription models, micropayments and the like. Frequently these systems function by restricting the user's ability to access the media object to a single media player. These systems may be termed "license-based." However, many users own multiple media players and would naturally prefer a model wherein a single purchase provides the user with the ability to access the media on one or more of the user's media players. There is a need for an "account-based" system of controlling access to media.

FIG. 1 illustrates the flow of control in one embodiment of the invention. A user at computing entity 230 views web page 200, containing a command inviting user to submit a voucher representing user's authorization to access network content which is described in an offer by some publisher. The voucher could have been issued by any suitable authorization mechanism. The voucher is based on the user having performed a transaction wherein the user paid for the content, presented a coupon, established a subscription, or performed any other method of gaining access to the content. The voucher could be embedded in the web page, or a cookie containing the voucher could have been sent, or any other suitable method of passing the voucher could be used. The voucher contains a unique id representing the transaction by which the user gained access.

The web page 200, running in a web browser on computing entity 230, causes the voucher to be submitted to the media access controller server 270, at step 240.

Media access controller server 270 performs a method of validating the voucher, in pseudo-code:
    if is Valid(voucher) then
        var t=generateToken(voucher);
        print 'http://wms/pp?token=t';
    endif;
and sends back web page 250 at step 290. 250 contains the URL 'http://wms/pp?token=t'. In this embodiment, 'wms' is the host address of media access manager server 300, '/pp' is an address for a publishing point on 300, and 't' is a token identifying the offer of network content and authorizing a single access to the content during a time window.

FIG. 1 thus permits a voucher to be used from multiple media players, subject to terms of service imposed by the publisher. A single media access controller server 270 could accept a voucher from one digital device such as a computer owned by a user who has purchased or otherwise obtained access to the content, and return a token authorizing access, and subsequently accept the same voucher from a second digital device and return another token authorizing access, thereby avoiding the need to restrict access to a single device, as has commonly been the practice in the past.

In one embodiment, the step 'generateToken(voucher)' is performed by a one-way hash function, such as MD5 or other one-way function, on the following arguments:
    The unique id for the transaction,
    A URL for a publishing point of the network content,
    A secret key
    A time window during which the token is valid.

Web page 250 contains a command allowing the user to begin access to the content, and the token described above. The user begins access at step 340, passing the token to media player 220, which could be Windows Media Player, Real Player, Winamp, or any other suitable software or hardware media player. Media player 220 then invokes media access manager server 300 at step 260, passing the token to 300.

Upon receipt of the token, media access manager server 300 invokes a playlist generation step on Playlist generator server 210 at step 330, sending a URL containing '/playlist.php?token=t'. Step 330 thus includes the token 't' and a request 'playlist.php' to generate the playlist. It should be noted that Playlist generator server 210 need not be a separate machine from media access manager 300. 210 and 300 could both be software services running on a single hardware server. In step 330, Playlist generator server 210 validates the token, and creates a dynamic playlist of media to be delivered at step 280, according to the following pseudo-code:
    if is Valid(token) then
        return('/PP');
    else
        return('/error.wav');
    endif;
'/PP' identifies a source publishing point. '/error.wav' is an example of an error message, in this case a media file. The error message could also be a text message or any other way of signaling an error.

Note that the playlist can be customized depending on the token, and may be specific to a particular user, demographic group, geographical area, time of day or season of year, or any other relevant business consideration. The playlist may include advertising, promotional materials, coupons or other media, as well as the network content access to which is authorized by the voucher. Or, if the token is invalid, expired, or otherwise not usable, 210 may return error messages in the playlist.

Media access manager server 300 delivers the content specified in the playlist it receives in 280 to the media player 220 in step 340. Media player 220 then renders the media for the user.

Figure 2:
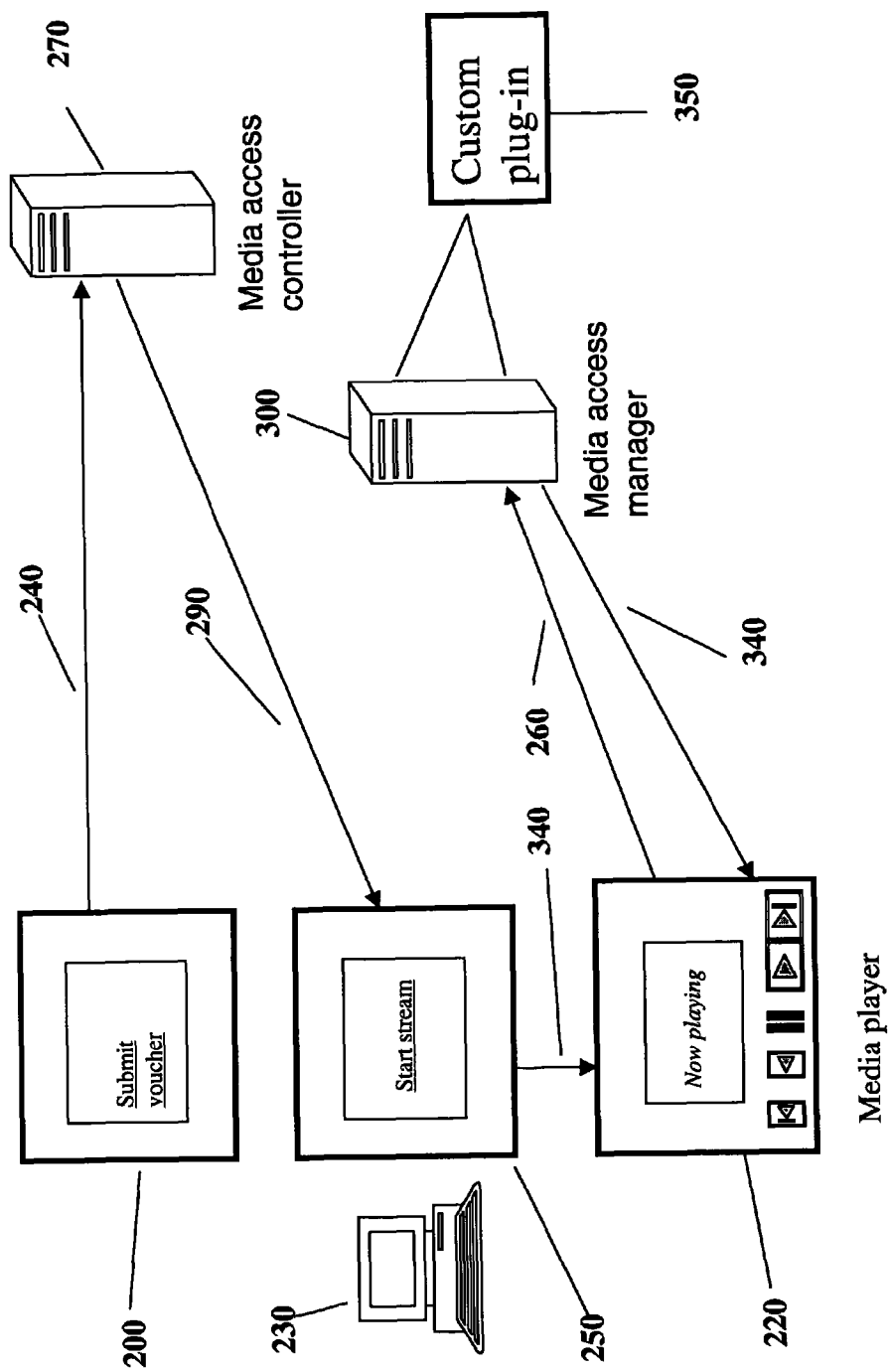
FIG. 2 is a diagram illustrating a network with attached servers belonging to seller and personal computer, personal media player, and web pages, illustrating the flow of control in one embodiment of the invention, in which a computer code labelled "custom plug-in" runs on a media access manager server.

FIG. 2 illustrates another embodiment of the invention. Custom plug-in 350 represents a plug-in which runs as a part of media access manager 300, and which determines compliance with the publisher's terms of service and implements such terms. Plug-in 350 could run as a Windows Media Server Active Script Event Handler Plug-in, where the media server is Windows Media Server, or 350 could be any plug-in supported by another media server running on 300, such as Darwin Streaming Server, QuickTime server, Real Networks servers, or other streaming technologies.

In FIG. 2, a user at computing entity 230 views web page 200, containing a command inviting user to submit a voucher representing user's authorization to access network content which is described in an offer by some publisher. In this embodiment, the voucher additionally comprises a time window during which the voucher is valid. The time window may be comprised of two timestamps, or a duration, or any other encoding of a time window.

The web page 200, running in a web browser on computing entity 230, causes the voucher to be submitted to the media access controller server 270, at step 240. The voucher could be embedded in the web page, or a cookie containing the voucher could have been sent, or any other suitable method of passing the voucher could be used.

Media access controller server 270 performs a method of validating the voucher, in pseudo-code:

```
if is Valid(voucher) then
    var t=generateToken(voucher);
    print                                              'http://wms/
        pp?token=t&unique_id=voucher.unique-id&
        endtime=voucher.endtime';
endif;
```
and sends back web page 250 at step 290. In this embodiment, 'wms' is the host address of media access manager server 300, '/pp' is an address for a publishing point on 300, 't' is a token identifying the offer of network content, 'voucher.unique-id' is a component of the voucher denoting a unique id for a transaction, and 'voucher.endtime' is a timestamp for the time at which the voucher expires. The returned URL thus contains the endtime and a unique id for the transaction.

Web page 250 contains a command allowing the user to start the stream, and a token, the content of which is described below. The user starts the stream at step 340, passing the token to media player 220, which could be Windows Media Player, Real Player, Winamp, or any other suitable software or hardware media player. Media player 220 then invokes media access manager server 300 at step 260, passing the token to 300.

Custom plugin 350 running on media access manager server 300 executes an algorithm represented by the following pseudo-code:
```
switch (event)
    case event==on Play:
        if is Valid(t) then
            if not compliesWithTermsOfService(t, unique-id)
                then
                return DO_NOT_PLAY;
            else
                storeInList(t, unique-id);
                return PLAY;
            endif
        else
            return DO_NOT_PLAY;
        endif
    endcase
    case event==on Stop:
        removeFromList(t, unique-id);
        return OK;
    endcase
endswitch
```
When the request first comes in, the media access manager server 300 generates an event "on Play". If the plug-in 350 returns PLAY, media access manager server 300 starts to deliver the content. If DO_NOT_PLAY is returned, in one embodiment the media access manager server 300 does not start the delivery, thus implementing "account-based" terms of service involving the maximum number of simultaneous streams permitted using a single voucher. In other embodiments 300 may take other actions including but not limited to inserting ads, inserting other content, delivering messages, or other communications. A user at a media player 220 would receive an error message informing him or her that access had been denied, and offering other information as defined by the publisher. When the media player 220 stops, the media access manager server 300 generates an event "on Stop".

Figure 4:
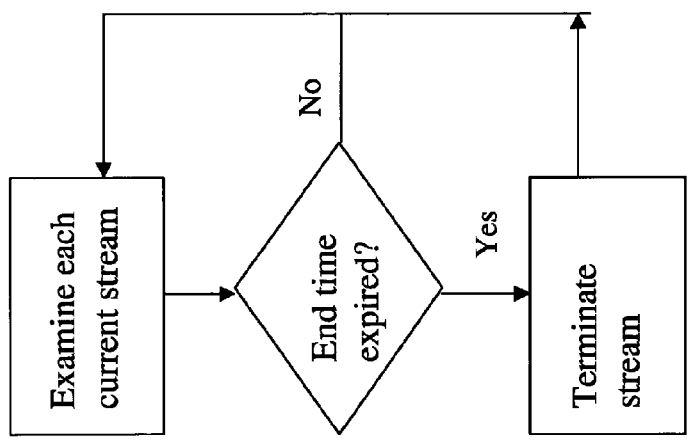
FIG. 4 is a flowchart illustrating a portion of the logic in the custom plug-in wherein streams whose voucher's end-time has expired are terminated.

Plug-in 350 also executes the logic illustrated in FIG. 4 on a periodic basis. In FIG. 4, each active stream in the media access manager 300 is examined as to the end time of voucher which was originally submitted to media access controller 270 to gain access to the stream. Each stream whose voucher's end time has expired is terminated, thus implementing the publisher's terms of service with respect to voucher end time.

Figure 3:
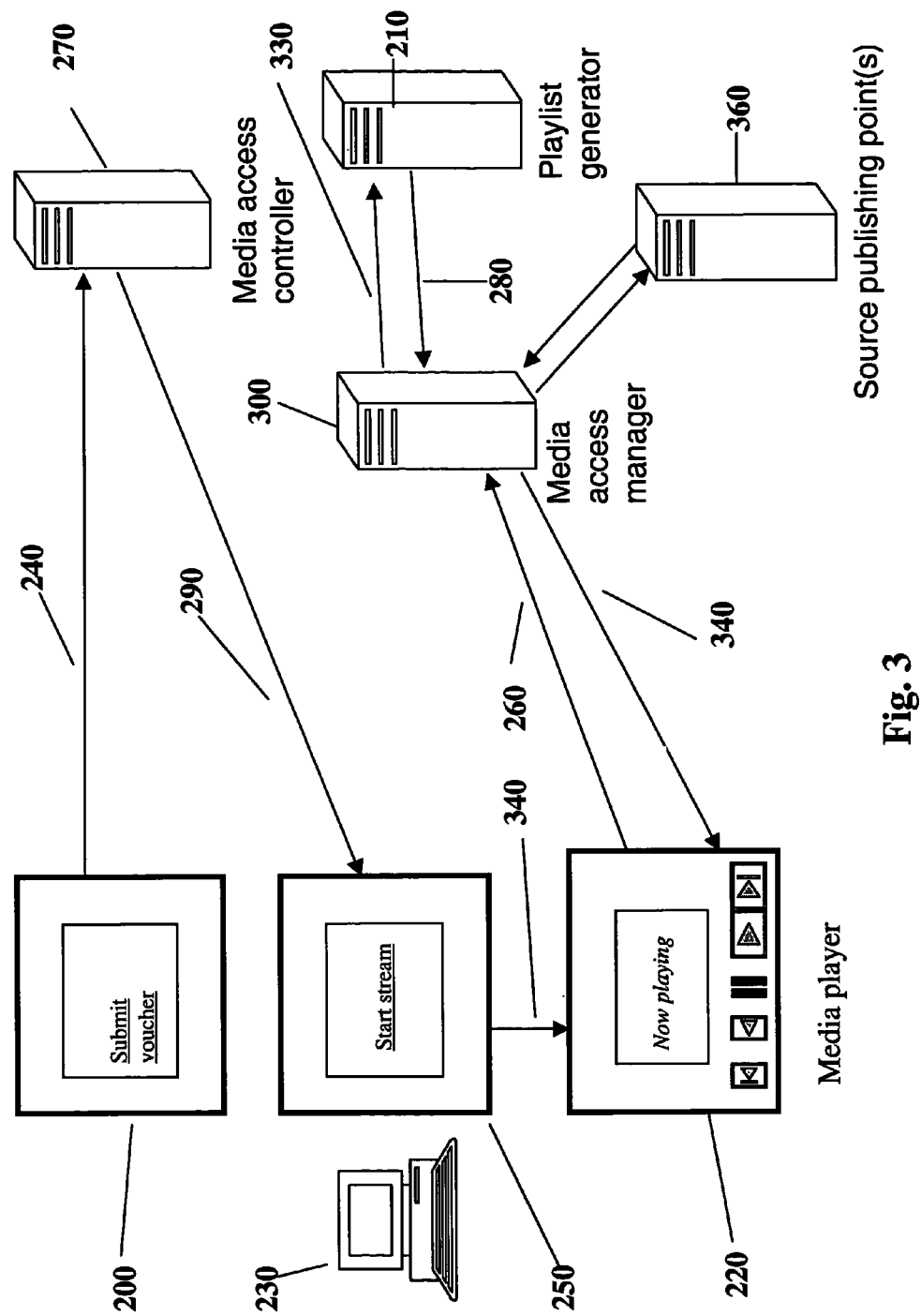
FIG. 3 is a diagram illustrating a network with attached servers belonging to seller and personal computer, personal media player, and web pages, illustrating the flow of control in another embodiment of the invention, in which a computer code labelled "custom plug-in" runs on a media access manager server, and in which there are multiple publishing points and source publishing points.

FIG. 3 illustrates another embodiment of the invention. In FIG. 3, media access manager server 300 is a "syndicate" providing access to multiple publishing points, some of which in turn may forward to other publishing points (not shown). Ultimately, the forwarding stops at a source publishing point, depicted as 360. Custom plugin 350 is assumed to be present but is omitted for visual simplicity.

In this embodiment, the web page 250 contains multiple source publishing points which the user is invited to select from. For example, the multiple source publishing points could represent different radio stations all owned by a common owner, or different mirror sites for a download service. In this example, there are three source publishing points, 'src1', 'src2', and 'src3'. Media access controller server 270 performs a method of validating the voucher, in the following pseudo-code:
```
if is Valid(voucher) then
    var t=generateToken(voucher);
    print                                              'http://wms/
        pp1?token=t&unique_id=voucher.unique-id&
        endtime=voucher.endtime&src=src1';
    print                                              'http://wms/
        pp1?token=t&uniqueid=voucher.unique-id&
        endtime=voucher.endtime&src=src2';
    print                                              'http://wms/
        pp1?token=t&unique_id=voucher.unique-id&
        endtime=voucher.endtime&src=src3';
endif;
```
In this embodiment, all components are as described above in FIG. 2, with the addition of the ids 'src1', 'src2', and 'src3' for the three source publishing points, and '/pp1' as one of the publishing points accessible through the media access manager 300.

The user selects a source publishing point 'src1' and starts the stream at step 340, passing the string '/pp1?token=t&unique_id=voucher.unique-id&endtime=voucher.endtime&src=src1' to media player 220. In step 330, the source publishing point id 'src1' is used to direct the playlist generation step to one of the source publishing points 360, as in the following pseudo-code:
```
if is Valid(token) then
    if (src=='src1') then
        return ('/src1');
    else if (src=='src2') then
        return ('/src2');
    else if (src=='src3') then
        return('/src3');
    else
        return ('/error.wav');
    end if
else
    return('/error.way');
endif;
```
Media access manager server 300 delivers the content specified in the playlist it receives in 280 (in this example '/sc1') to the media player 220 in step 340. Media player 220 then renders the media for the user.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method of managing access to network content, comprising steps of:
   validating a token prior to granting access to network content at a publishing point, the token having been generated separate and distinct from but based on a voucher that was validated as a valid authorization to access the network content, the voucher having associated therewith a publisher's terms of service for delivery of the network content, and the token comprising a unique id identifying a particular transaction through which access to the network content has been granted by issuing the voucher; and
   denying access to the network content when the validated token is not in compliance with the publisher's terms of service associated with the voucher, wherein the terms of service comprise a maximum number of streams to the network content associated with the unique id which may exist at any one time on a server and wherein the denying access to the network content comprises checking a number of current streams associated with the unique id on the server, and determining that compliance with the terms of service does not exist if the number of current streams is greater than or equal to the maximum number.

2. The method of claim 1 wherein the denying step comprises terminating one of the current streams if compliance does not exist.

3. The method of claim 1 wherein the denying step comprises denying access if compliance does not exist.

4. The method of claim 1 further comprising a step of invoking a playlist generation step in a source publishing point if compliance exists.

5. The method of claim 1 further comprising steps of:
   periodically checking a current stream of the network content on a media server associated with a voucher, and wherein the voucher is associated with an end time at which the voucher expires; and
   causing termination of the current stream when a current time of the media server is passed the voucher end time.

6. The method of claim 5 wherein the periodically checking and causing steps are performed by a plug-in operating on the media server.

7. The method of claim 6 wherein the periodically checking and causing steps are performed by the media server which is operatively configured as a Windows Media Server.

8. The method of claim 7 wherein the periodically checking and causing steps are performed by a plug-in operatively configured as a Windows Media Server Active Script Event Handler Plug-In.

9. An apparatus for managing access to network content, comprising:
   a validator of tokens operatively configured to validate each token prior to granting access to network content, wherein each token represents an authorization to access network content at a publishing point, each token has been generated separate and distinct from but based on a voucher, the voucher having associated therewith a publisher's terms of service for delivery of the network content, and the voucher comprises a unique id identifying a particular transaction through which access to network content has been granted; and
   a checker operatively configured to determine compliance of the validated token with the publisher's terms of service associated with the voucher, wherein the terms of service comprise a maximum number of streams associated with one voucher which may exist at any one time on a server, the checker comprising a reporter operative to report that compliance with the publisher's terms of service does not exist if a number of current streams on the server associated with the voucher exceeds the maximum and wherein the checker denies access to the network content when the validated token is not in compliance with the publisher's terms of service associated with the voucher.

10. The apparatus of claim 9 wherein the terms of service comprise an end time for each voucher when the voucher expires, and the checker comprising a reporter operative to report that compliance with the terms of service for a particular voucher does not exist if a current server time is past the end time for that particular voucher.

11. The apparatus of claim 9 wherein the checker is operatively configured to terminate previously granted access to the network content if compliance with terms of service of the voucher does not to exist.

12. The apparatus of claim 9 wherein computer code to implement functionality of the validator and checker is operatively configured as a plug-in for execution on a server that executes Windows Media Server.

13. The apparatus of claim 12 wherein the plug-in comprises a Windows Media Server Active Script Event Handler Plug-in.

* * * * *